United States Patent
Lee et al.

(10) Patent No.: US 7,756,070 B2
(45) Date of Patent: Jul. 13, 2010

(54) METHOD FOR SUPPORTING PILOT BOOST IN E-DCH OF WCDMA

(75) Inventors: Ju-Ho Lee, Suwon-si (KR); Sung-Ho Choi, Suwon-si (KR); Gaoke Du, Beijing (CN); Xiaoqiang Li, Beijing (CN); Yujian Zhang, Beijing (CN)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 109 days.

(21) Appl. No.: 10/577,919

(22) PCT Filed: Nov. 15, 2004

(86) PCT No.: PCT/KR2004/002958

§ 371 (c)(1),
(2), (4) Date: Feb. 20, 2007

(87) PCT Pub. No.: WO2005/048491

PCT Pub. Date: May 26, 2005

(65) Prior Publication Data

US 2007/0211684 A1    Sep. 13, 2007

(30) Foreign Application Priority Data

Nov. 14, 2003    (CN)    ............ 2003 1 0114340

(51) Int. Cl.
H04B 7/185    (2006.01)
(52) U.S. Cl. ............ 370/318; 455/13.4; 455/522; 455/571

(58) Field of Classification Search ............... 370/335, 370/342
See application file for complete search history.

(56) References Cited

U.S. PATENT DOCUMENTS

| | | | |
|---|---|---|---|
| 2002/0115464 A1* | 8/2002 | Hwang et al. | 455/522 |
| 2003/0036403 A1 | 2/2003 | Shiu et al. | |
| 2003/0210668 A1* | 11/2003 | Malladi et al. | 370/335 |
| 2004/0228315 A1* | 11/2004 | Malkamaki | 370/342 |
| 2005/0041626 A1* | 2/2005 | Tiirola et al. | 370/335 |

FOREIGN PATENT DOCUMENTS

EP    1089455    4/2001

* cited by examiner

Primary Examiner—Rafael Pérez-Gutiérrez
Assistant Examiner—Marcos Batista
(74) Attorney, Agent, or Firm—Roylance, Abrams, Berdo & Goodman, L.L.P.

(57) ABSTRACT

The method for supporting pilot boost to the uplink dedicated channels in the WCDMA system comprising steps of: transmitting E-TFCI to a Node B by a UE; adjusting an uplink pilot power boosting amplitude by the UE according to the E-TFCI; and performing a uplink inner loop power control by the Node B according to a measured SIR, a target preset by the inner loop power control and a pilot boost amplitude resulted from the E-TFCI. The object of supporting pilot boost is achieved by transmitting E-TFCI in advance by the UE, adjusting the power of pilot according to the E-TFCI properly, and considering the pilot power boosting amplitude when the Node B performs inner loop power control in the invention. Thus, the object of improving the capacity of the wireless communication system can be accomplished through supporting the pilot boost in the invention.

9 Claims, 9 Drawing Sheets

METHOD FOR SUPPORTING PILOT BOOST IN E-DCH OF WCDMA

BACKGROUND OF THE INVENTION

1. Field of the Invention

The present invention relates to enhanced uplink dedicated channel (Enhanced DCH, hereinafter referred to simply as E-DCH) in WCDMA, especially to the method for supporting pilot boost by transmitting the transport format combination indicator of the E-DCH (E-TFCI) in advance in the E-DCH.

2. Description of the Related Art

FIG. 1 shows the uplink physical channel structure of a user equipment (hereinafter referred to simply as UE) in version R99/Rel-4 in a frequency division duplex (hereinafter referred to simply as FDD) WCDMA system.

101 Dedicated Physical Data Channel (hereinafter referred to simply as DPDCH). In the FDD system, the physical channel includes the dedicated physical data channel and the dedicated physical control channel. The DPDCH is used for transmitting a dedicated channel (hereinafter referred to simply as DCH).

102 Dedicated Physical Control Channel (hereinafter referred to simply as DPCCH). The DPCCH is used for transmitting control information of the physical layer. Gain factors are applied to set the power ratio for the corresponding DPDCH and DPCCH respectively. The DPCCH is composed of pilot, transport format combination indicator (hereinafter referred to simply as TFCI), feedback information (hereinafter referred to simply as FBI) and transmit power control commands (hereinafter referred to simply as TPC).

102A Pilot which is used for channel estimation and power control. In the wireless communication system, it is difficult to recover the transmitted signal by directly processing the received signal since the wireless channel has made some modification to the phase of the transmitted signal. To solve this problem, the transmitter should transmit some known training sequences. Therefore, the receiver can recover the phase of the transmit signal by obtaining the information on the channel from the received training sequence so as to improve the correctness of signal receiving. This process is called channel estimation. The pilot is a kind of training sequence for channel estimation. In addition, because the pilot is a known sequence and the measure of Signal-to-Interference Ratio (hereinafter referred to simply as SIR) is easily conducted for it, it is also often used for power control.

102B TFCI which is the concept of TFCI is specially described in the following section.

102C FBI which is used for transmitting the feedback information from the UE to the network in the techniques such as closed-loop transmit diversity and site selection diversity transmit power control.

102D TPC which is the uplink transmitted TPC of the UE are used for power control on the downlink transmitted signal of Node B.

Now, the concept of the TFCI will be explained. In the WCDMA system, the transport channels are services that the physical layer provides to the higher layers. The DCH mentioned above is one of the transport channels. Within one transmission time interval (hereinafter referred to simply as TTI), the physical layer exchanges transport blocks which is from zero to several with the media access control layer (hereinafter referred to simply as MAC) in one transport channel. At present, the TTI of the DCH in the FDD can be 10 ms, 20 ms, 40 ms or 80 ms. The number of bits in each transport block is called transport block size (hereinafter referred to simply as TBS). The set of transport blocks within one TTI of a transport channel is called the transport block set. The number of bits in one transport block set is called transport block set size (hereinafter referred to simply as TBSS). One transport channel or more can be multiplexed to one code composite transport channel (hereinafter referred to simply as CCTrCH) simultaneously and then mapped to the physical layer. The TBS reflects the data rate of the transport channel, while the TBSS reflects the total data rate of CCTrCH. For the transport channel, the format used for data exchanging between the physical layer and the MAC layer within one TTI is defined as the transport format (hereinafter referred to simply as TF). The TF mainly includes the TBS and the TBSS. The set of transport formats corresponding to each transport channel is called transport format set. The number of each TF in the transport format set is called the transport format indicator (hereinafter referred to simply as TFI). In the CCTrCH, one combination of the TF of one transport channel is called transport format combination (hereinafter referred to simply as TFC). The TFCI is used for notifying the receiver of the TFC mapped to the current CCTrCH so as to receive the DPDCH correctly. With the received TFCI, the TFI of each transport channel in the CCTrCH can be obtained so that the receiving end can decode the information included in each transport channel. In existing systems, the TFCI and the DPDCH corresponding to it are transmitted simultaneously.

FIG. 2 shows the process of generating, transmitting and receiving the TFCI in the WCDMA system. In the transmitter of the UE, two dedicated channels 201 and 205 are multiplexed to one CCTrCH. The Dedicated channel 201 corresponding to the TFI 202 includes two transport blocks, i.e., block 203 and 204. Similarly, the dedicated channel 205 corresponding to the TFI 206 includes two transport blocks, i.e., block 207 and 208. The TFI 202 and the TFI 206 are combined and indicated with the TFCI 209 by the physical layer of the UE. Then, the TFCI 209 is multiplexed into the DPCCH 210 after it is encoded by the physical layer of the UE and transport block 203, 204, 207 and 208 are transmitted through the DPDCH 212 after they are encoded and multiplexed (this process is implemented by the module 211). The DPCCH 210 and DPDCH 212 are transmitted via the wireless channel to reach the base station (hereinafter referred to simply as Node B). The Node B obtains the TFCI 214 from the received DPCCH 213, and the TFI 217 of dedicated channel 201 and the TFI 220 of dedicated channel 205 are obtained after the TFCI 214 is decoded. The Node B obtains the transport block 219 and 218 after decoding and demultiplexing the module 216 according to the TFI 217, and the transport block 219 and 218 correspond to the transmitted block 203 and 204 respectively. Similarly, the Node B obtains transport block 222 and 221 after decoding and demultiplexing the module 216 according to the TFI 220, and the transport block 222 and 221 correspond to the transmitted block 207 and 208 respectively.

The E-DCH is a research issue on enhancing the existing uplink dedicated channels under the standardization by 3rd Generation Partnership Project (hereinafter referred to simply as 3GPP). The object of the research is to improve the uplink system performance for the FDD system by studying on techniques of adaptive modulation & coding, hybrid automatic repeat request and Node B controlled scheduling. The concepts of E-DCH, E-DPDCH, E-DPCCH and E-TFCI have been introduced in the research of E-DCH. The E-DCH per se is a new kind of dedicated transport channel or an improved to the existing DCH. It should be noted that the E-DCH represents following two aspects in the present application: the research project and the research object in the project. Similar to the relationship between the E-DCH and the DCH, the E-DPDCH is a new kind of dedicated physical data channel or an improved to the existing DPDCH. Likewise, the E-DPCCH is the new kind of dedicated physical control channel associating to the E-DPDCH or an improved to the existing DPCCH. Several DCHs and E-DCHs can exist in the uplink transport channel of the UE. Following two multiplexing methods can be applied in the E-DCH and the existing DCH: the time division multiplexing (hereinafter referred to simply as TDM) and the code division multiplexing (hereinafter referred to simply as CDM). Here, the former means that the E-DCH and the DCH are multiplexed to the same code channel, while the latter to different ones, i.e., different code channels are adopted in the E-DPDCH and the DPDCH. Corresponding to the E-DCH, the E-TFCI is adopted to indicate the transport format combination of the E-DCH. After the concept of the E-TFCI has been introduced in the present application and for the convenience of distinguishing, the TFCI corresponding to the DCH is called D-TFCI, which indicates the transport format combination of the DCH. The E-TFCI can be transmitted via the existing DPCCH, i.e., the E-TFCI and the D-TFCI can be multiplexed to TFCI 102B of DPCCH with the method of coding. Also, the E-TFCI can be transmitted via the physical channel (e.g., E-DPCCH) other than the DPCCH.

In the CDMA system, the power control is the very important approach in solving the problem of near-far effect and improving the system capacity. The power control includes two levels of inner loop power control and the outer loop power control. The outer loop power control sets the target for the inner loop power control according to the requirements of the QoS. And the inner loop power control adjusts the transmitting power according to the target preset by the outer loop power control, that is, adjusting the received SIR within the permitted range of the target of the inner loop power control (hereinafter referred to simply as $SIR_{target}$). In the FDD system, the inner loop power control operates once in every time slot (Slot for short). The uplink inner loop power control refers to the one that the Node B controls uplink transmitting power of the UE. And the downlink inner loop power control refers to the one that UE controls downlink transmitting power of the Node B.

FIG. 3 illustrates the process that the uplink inner loop power control operates in the existing WCDMA system. Data 301 transmitted from the UE reaches the base station after it is adjusted by the transmitting power control module 302 and passes through the radio channel. Denote the SIR that the Node B has measured for the uplink DPCCH by $SIR_{est}$. The $SIR_{est}$ is obtained mainly by measuring the pilot, or it can be obtained by the measured data or other techniques. In the comparing and judging module 304, the Node B compares the $SIR_{est}$ with the $SIR_{target}$ and if the $SIR_{est}$ is less than the $SIR_{target}$, the Node B sends the "TPC UP" command to the UE to increase the transmitting power; otherwise, it sends the "TPC DOWN" command to the UE to decrease the transmitting power. In the existing system, the $SIR_{target}$ per se is adjusted by the outer loop power control but this adjustment has nothing to do with the data rate. The TPC commands 305 sent from the Node B are transmitted to the UE via the radio channel 306. Having received the downlink TPC command, the UE adjusts the transmitting power for the uplink DPCCH, DPDCH and E-DPDCH (only in the E-DCH) according to the requirement of the received TPC command in the transmitting power control module 302. The adjustment amplitude called the power control step size that UE operates to the transmitting power is specified by the network. In current WCDMA standard, the power control step size can be 1 dB, 2 dB or 3 dB. The power adjustment of the DPCCH can be calculated by equation (1) below:

$$\Delta_{DPCCH} = \Delta_{TPC} \times TPC\_cmd \quad (1)$$

Where: $\Delta_{TPC}$ stands for the power control step size; TPC_cmd is determined by the downlink TPC sent from the Node B. When Node B sends the TPC UP via the downlink, TPC_cmd=+1; otherwise, TPC_cmd=−1. For instance, when the power control step is 2 dB and the Node B sends TPC UP via the downlink, the UE boost the transmission power by 2 dB for the DPCCH.

The UE adjusts the transmitting power for other physical channels other than the DPCCH according to the corresponding gain factors. Every physical channel has a gain factor corresponding to a TFC. FIG. 9 shows the structure of a kind of physical channel of E-DCH. All four physical channels like 901, 902, 903 and 904 corresponding to DPDCH, E-DPCCH, E-DPDCH and DPCCH respectively are shown in FIG. 9. In the uplink of the FDD system, every physical channel requires the process of spreading, then multiplies by the gain factor. $c_d$, $c_T$, $c_{eu/d}$ and $c_c$ are the channel codes for the DPDCH, E-DPCCH, E-DPDCH and DPCCH respectively. And the corresponding gain factors are $\beta_d$, $\beta_T$, $\beta_{eu/d}$ and $\beta_c$ respectively. The DPDCH's spreading module and product of gain factor module are 905 and 909 respectively. Similarly, the spreading module and the product of gain factor module of the E-DPCCH are 906 and 910 respectively, spreading module and product of gain factor module of the E-DPDCH are 907 and 911 respectively, and the spreading module and product of gain factor module of the DPCCH are 908 and 912 respectively. The data of the DPDCH multiplied by the gain factor and that of E-DPCCH multiplied by the gain factor are added in the adder 913 to yield the data of branch I. The data of the E-DPDCH multiplied by the gain factor and that of the DPCCH multiplied by the gain factor are added in the adder 914 and multiply by j in procedure 915 to yield the data of branch Q. Finally, data of branch I and Q pass through the adder 916 to yield the data of base band signal. Above is the explanation to the structure of a kind of physical channel of E-DCH. It should be noted that the transmitting power of any other physical channel other than the DPCCH can be determined by the corresponding gain factor, i.e., the transmitting power of any other physical other than the DPCCH is determined when that of the DPCCH has been adjusted according to the downlink TPC commands.

In the wireless communication system, reducing the SNR (signal-to-noise ratio) of the receiver will improve the capacity of the entire system on condition that certain QoS is satisfied. In the research of E-DCH, it is found that: proper boosting of the pilot SIR for the high rate data can improve the performance of channel estimation, therefore the SNR of all signals of the UE for the Node B has been greatly reduced so that the system capacity has been improved. This idea is called pilot boost. However, in the existing system, the pilot SIR has nothing to do with the application data rate but is under the control of the outer loop power control. The inner loop power control aims at adjusting the pilot SIR to approach the target preset by the outer loop power control. If the pilot SIR is boosted, the Node B will make a wrong assumption that channels have been improved. Consequently, the pilot SIR will be reduced to its original level through the power control. So, the object of improving the pilot SIR for high data rate system can not be reached simply through increasing the pilot SIR with no other associated techniques.

SUMMARY OF THE INVENTION

The object of present invention is to provide a simple but effective method for supporting pilot boost so as to improve the capacity of the wireless communication system.

To achieve the object mentioned above, a method for supporting pilot boost to the uplink dedicated channels in the Wideband Code Division Multiple Access system comprising steps of:

transmitting E-TFCI to a Node B by a UE before transmitting a E-DCH corresponding to the E-TFCI;

adjusting an uplink pilot power boosting amplitude by the UE according to the E-TFCI; and performing a uplink inner loop power control by the Node B according to a measured SIR, a target preset by the inner loop power control and a pilot boost amplitude resulted from the E-TFCI.

The method for supporting pilot boost through transmitting E-TFCI in advance is proposed in the present invention. In this method, the object of supporting pilot boost is achieved by transmitting E-TFCI in advance by the UE, adjusting the power of pilot according to the E-TFCI properly, and considering the pilot power boosting amplitude when the Node B performs inner loop power control. Thus, the object of improving the capacity of the wireless communication system can be accomplished through supporting the pilot boost in the invention. The power of pilot is completely used for the channel estimation and the power control, so that the uplink power resource has been made full use of in the present invention.

DETAILED DESCRIPTION OF THE PREFERRED EMBODIMENTS

A method for supporting pilot boost by transmitting E-TFCI in advance is proposed in the present invention. This method is composed of following three important parts:

1) The UE adjusts the uplink pilot power boosting amplitude according to the E-TFCI.

Figure 10:
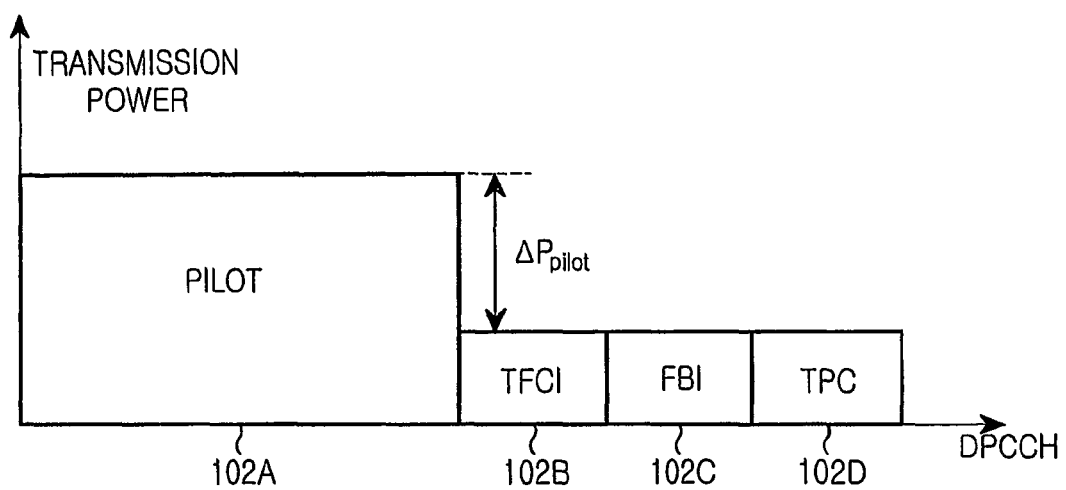
FIG. 10 illustrates the process of boosting the pilot power in DPCCH.

FIG. 10 illustrates the process of boosting the power of the pilot in the DPCCH. In FIG. 10, the pilot power boosting amplitude $\Delta P_{pilot}$ refers to the power increment of pilot 102A with regard to the power of rest (e.g., TFCI 102B and TPC 102D) in the DPCCH. The power boosting of the Pilot can be 0 dB (i.e., no boosting to the power of the pilot). For high data rate, system capacity can be improved by boosting the power of the pilot properly.

The relationship between the E-TFCI and the corresponding pilot power boosting amplitude can be specified in following two approaches. One is to clearly specify the correspondence relationship with a table or a computation formula in the standard. The other is to specify the algorithm in the standard to compute the pilot power boosting amplitudes of the other E-TFCI according to that of the reference E-TFCI.

2) The UE transmits the E-TFCI to the Node B before transmitting the E-DCH corresponding to the E-TFCI.

Following two methods may be adopted for the UE to transmit the E-TFCI in advance: one is that UE transmits the E-TFCI to the Node B before transmitting the E-DCH corresponding to the E-TFCI, and transmits the D-TFCI to the Node B before transmitting the DCH corresponding to the D-TFCI. In this case, if the E-TFCI and the D-TFCI are encoded and multiplexed into the TFCI of DPCCH, it means that the TFCI has been transmitted before the transmission of the E-DCH corresponding to the E-TFCI. The other is that the UE transmits the E-TFCI before the transmission of the E-DCH corresponding to the E-TFCI, but transmits the D-TFCI and the corresponding DCH synchronously. The advantage of the method is that ensures the compatibility with the previous versions.

Figure 7:
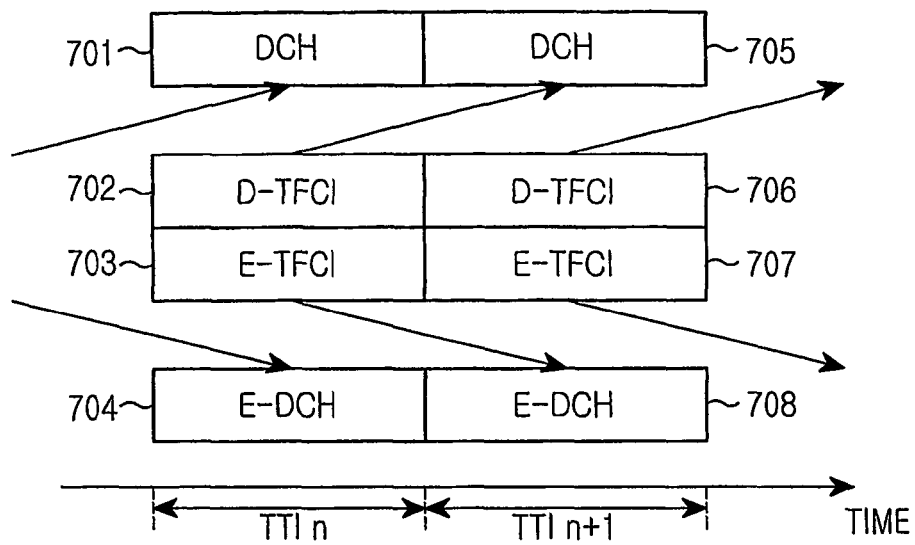
FIG. 7 illustrates the operations of transmitting both D-TFCI and E-TFCI in advance.

FIG. 7 shows the operations of transmitting both the D-TFCI and the E-TFCI in advance. In FIG. 7, 701, 702, 703 and 704 are the DCH, D-TFCI, E-TFCI and E-DCH respectively at TTI n. And at TTI n+1, 705, 706, 707 and 708 are the DCH, D-TFCI, E-TFCI and E-DCH respectively. At TTI n, the D-TFCI 702 indicates the DCH 705 at TTI n+1, and the E-TFCI 703 indicates the E-DCH 708 at TTI n+1.

Figure 8:
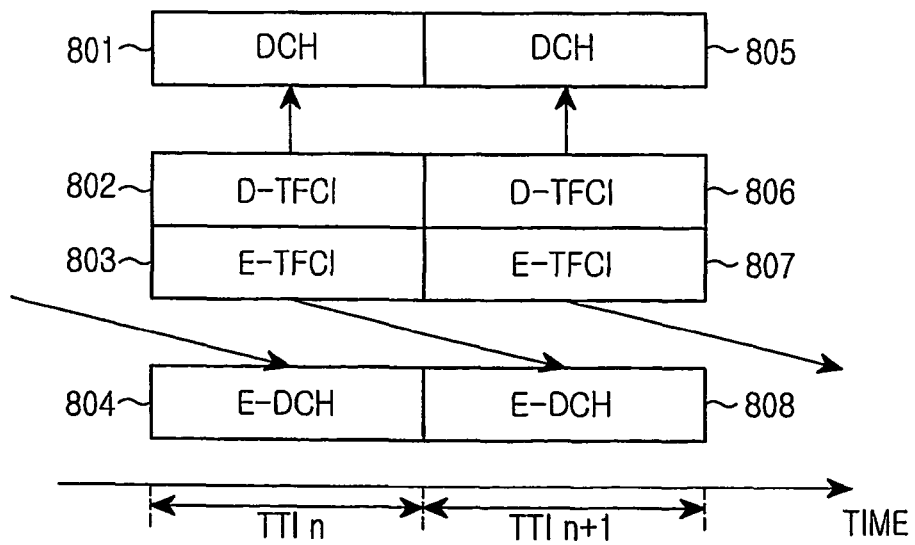
FIG. 8 illustrates the operations of transmitting the E-TFCI in advance while the D-TFCI synchronously.
Figure 9:
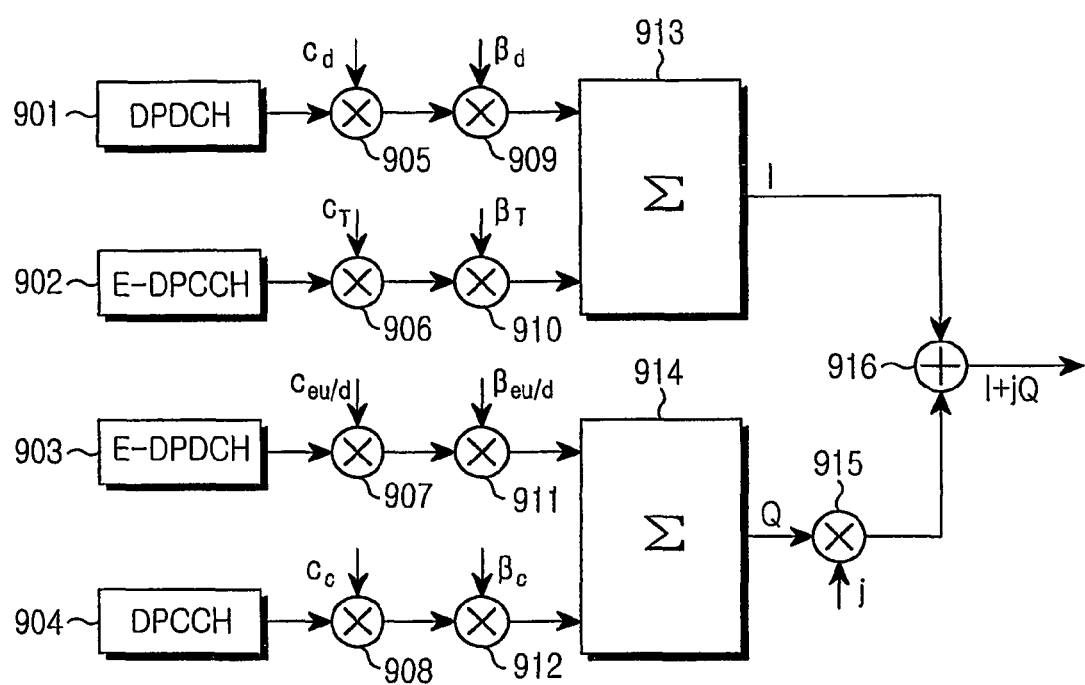
FIG. 9 shows the structure of a kind of physical channel of E-DCH.

FIG. 8 illustrates the operation process of transmitting E-TFCI in advance but D-TFCI synchronously. In FIG. 8, 801, 802, 803 and 804 are the DCH, D-TFCI, E-TFCI and E-DCH respectively at TTI n. And at TTI n+1, 805, 806, 807 and 808 are DCH, D-TFCI, E-TFCI and E-DCH respectively. At TTI n, the D-TFCI 802 indicates the DCH 801 at TTI n+1, and the E-TFCI 803 indicates the E-DCH 808 at TTI n+1.

FIGS. 7 and 8 do not show the actual frame structure but the timing relationship. In FIGS. 7 and 8, the DCH and E-DCH share the same TTI for the convenience of explanation. It is clearly that the DCH and the E-DCH can have different TTIs. In FIGS. 7 and 8, the E-TFCI is transmitted one TTI earlier than the transmission of the E-DCH. It is clearly that the E-TFCI can be transmitted several TTIs earlier than the transmission of the E-DCH.

With the transmission of the E-TFCI in advance, the Node B can obtain the pilot power boosting amplitude from the received information on the E-TFCI and consider this factor when performing inner loop power control. The timing relationship on the transmission of the E-TFCI in advance must satisfy that the end time of E-TFCI's TTI must be earlier than the starting time of TTI of the E-DCH corresponding to the E-TFCI.

3) The Node B must consider the pilot power boosting amplitude when performing the inner loop power control.

In the existing FDD system, the Node B compares the measured SIR with the inner loop power control target to determine whether to make the UE increase or decrease the transmitting power. The Node B makes a comprehensive consideration on the measured pilot SIR, the inner loop power control target and the pilot power boosting amplitude derived from the E-TFCI to generate a TPC command for the downlink in present invention. That is to say, if $SIR_{est} < SIR_{target} + \Delta P_{pilot}$, the Node B sends the TPC UP command to demand the UE to increase the transmitting power; otherwise, it sends the TPC DOWN command to demand the UE to decrease the transmitting power. The present invention does not relate to the adjustment of $SIR_{target}$, i.e., the present invention does not relate to the outer loop power control.

Embodiments

Referring to the figures attached, one embodiment of the invention is described in the following. To avoid making the description of the application be too tedious, detailed descriptions for functions or means being familiar to the public are omitted.

Now, one embodiment of the invention is described in two aspects of the operations in the network and that in the UE.

Figure 4:
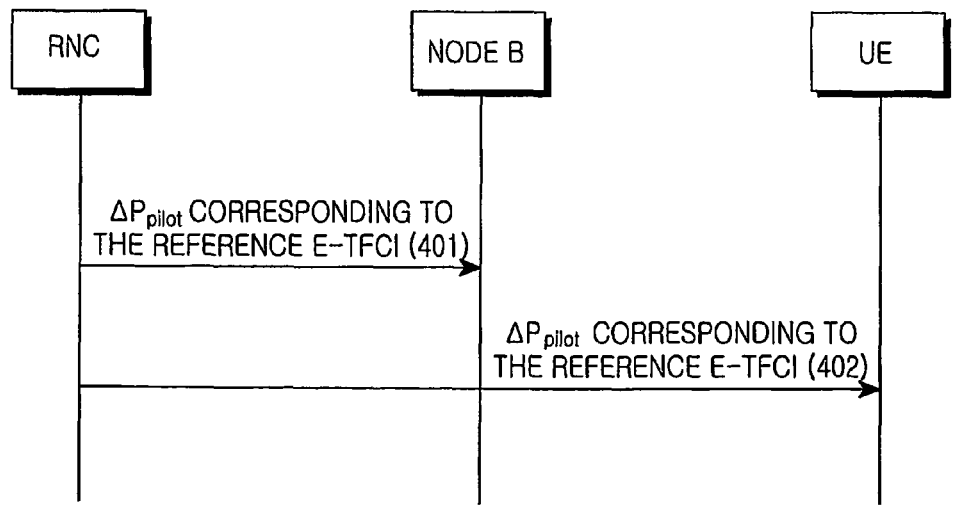
FIG. 4 illustrates the process that the RNC notifies the Node B and UE of the pilot power boosting amplitude corresponding to the reference E-TFCI.

1) Operations in the Network End:

FIG. 4 illustrates the process that the Radio Network Controller (hereinafter referred to simply as RNC) notifies the Node B and the UE of the pilot power boosting amplitude corresponding to the reference E-TFCI. 401 is the process that the RNC notifies the Node B through the Iub signaling of the pilot power boosting amplitude corresponding to the reference E-TFCI. 402 is the process that the RNC notifies the UE through RRC signaling of the pilot power boosting amplitude corresponding to the reference E-TFCI. For the consideration of simplification, the signaling returned from the Node B and the UE to the RNC has not been plotted in FIG. 4. Furthermore, the timing relationship of signaling in FIG. 4 is not critical, i.e., it can be either the signaling 402 is transmitted to the UE first or the signaling 401 is transmitted to the Node B first. The Signaling 401 is either the new Iub signaling or the extension of the existing Iub signaling. Similarly, the signaling 402 is either the new RRC signaling or the extension of the existing RRC signaling. After receiving the signaling 401, the Node B should save the contents of this signaling. In this way, the Node B can calculate the pilot power boosting amplitudes corresponding to the other E-TFCI or TFCI according to that of the received corresponding to the reference E-TFCI.

Following is an algorithm of calculating the $\Delta P_{pilot}$ corresponding to any other E-TFCI according to the $\Delta P_{pilot}$ corresponding to the reference E-TFCI.

It is assumed the sum of TBSS of all E-DCHs corresponding to the reference E-TFCI is $TBSS_{ref}$, and the corresponding $\Delta P_{pilot}$ is $\Delta P_{pilot,ref}$, the sum of TBSS of all E-DCHs corresponding to a certain E-TFCI is $TBSS_{other}$, then the $\Delta P_{pilot}$ corresponding to the E-TFCI can be calculated (in logarithm domain) according to equation (2) below:

$$\Delta P_{pilot,other} = \Delta P_{pilot,ref} + K \times \log_{10}(TBSS_{other}/TBSS_{ref}) \quad (2)$$

Where: K is used for adjusting the amplitude of $\Delta P_{pilot}$ with the change of the TBSS. K can be specified directly in the standard, or can be notified the UE and the Node B through the RRC signaling and Iub signaling respectively. Similar to the signaling used for transmitting the $\Delta P_{pilot}$ corresponding to the reference E-TFI, the RRC signaling used for transmitting K is either a new one or the extension of the existing RRC signaling. And the Iub signaling used for transmitting K can be either a new one or to the extension of the existing Iub signaling. K can also be incorporated in the RRC signaling or Iub signaling used for transmitting the pilot power boosting amplitude signaling corresponding to the reference E-TFCI.

Figure 5:
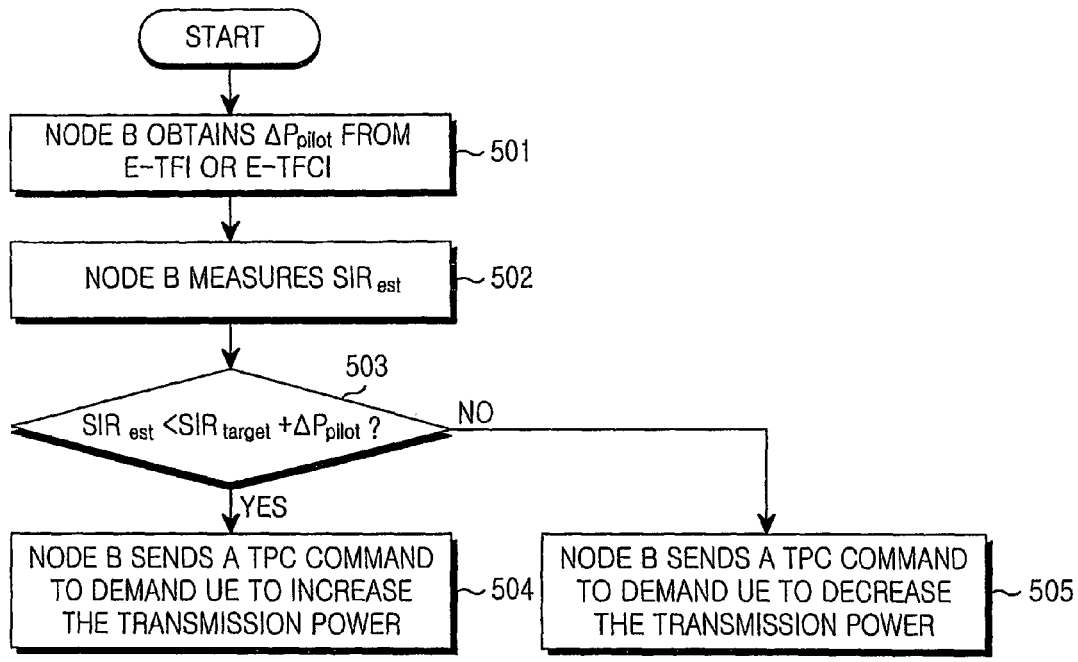
FIG. 5 illustrates the inner loop power control operations performed by the Node B in each time slot in the present invention.
Figure 6:
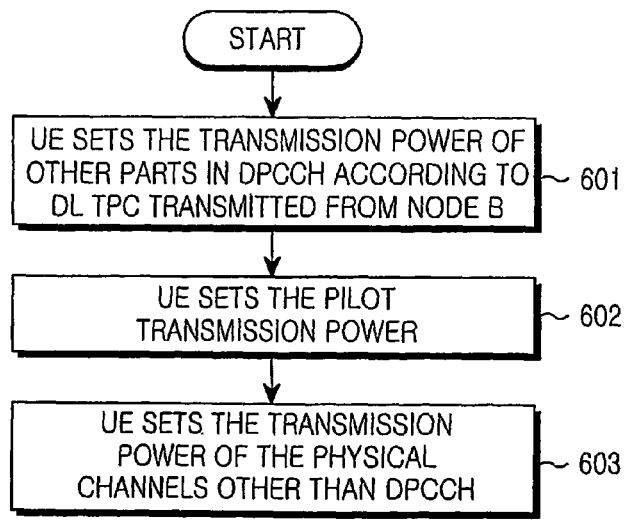
FIG. 6 illustrates the inner loop power control operations performed by the UE in each time slot in the present invention corresponding to FIG. 5.

FIG. 5 illustrates the inner loop power control operations performed by the Node B in each time slot in the present invention. Corresponding to FIG. 5, FIG. 6 illustrates the inner loop power control operations performed by the UE in each time slot in the present invention.

In step 501 in FIG. 5, the Node B obtains the pilot power boosting amplitude $\Delta P_{pilot}$ according to the E-TFCI when performing inner loop power control.

In step 502 in FIG. 5, the Node B estimates the $SIR_{est}$ of the received signal.

In step 503 in FIG. 5, the Node B judges whether the $SIR_{est}$ is less than the sum of $SIR_{target} + \Delta P_{pilot}$ or not. If so, the process goes to 504. If not, goes to 505. The $SIR_{target}$ is still adjusted according to the approach of outer loop power control specified in the R99/Rel-4/Rel-5, i.e., the present invention has no modification to the operations of outer loop power control in the existing system.

In step 504 in FIG. 5, the Node B sends the TPC UP command to demand the UE to increase the transmitting power.

In step 505 in FIG. 5, the Node B sends the TPC DOWN command to demand the UE to decrease the transmitting power.

2) Operations in the UE End:

After the UE receives signaling 402, it should save the contents of this signaling. In this way, it can calculate the $\Delta P_{pilot}$ corresponding to any other E-TFCI according to the $\Delta P_{pilot}$ corresponding to the reference E-TFCI. For details, please refer to equation (2).

Corresponding to FIG. 5, FIG. 6 illustrates the inner loop power control operations performed by the UE in each time slot in the present invention.

In step 601 in FIG. 6, the UE sets the transmitting power of other parts like the TFCI and the TPC for the DPCCH according to the TPC transmitted from the Node B via the downlink. The setting approach is consistent with the inner loop power control specified in existing R99/Rel-4/Rel5. Denote $P_c$ as the transmitting power (in logarithm domain) of other parts of the set DPCCH.

In step 602 in FIG. 6, the UE obtains the pilot power boosting amplitude $\Delta P_{pilot}$ according to the received E-TFCI. Denote $P_{pilot}$ as the transmitting power of the pilot (in logarithm domain). Then the $P_{pilot}$ can be calculated according to equation (3) below:

$$P_{pilot} = P_c + \Delta P_{pilot} \quad (3)$$

In step 603 in FIG. 6, the UE sets the transmitting power for the uplink physical channels (such as DPDCH, E-DPDCH and E-DPCCH) other than the DPCCH by the gain factors according to the method in the existing system.

Figure 1:
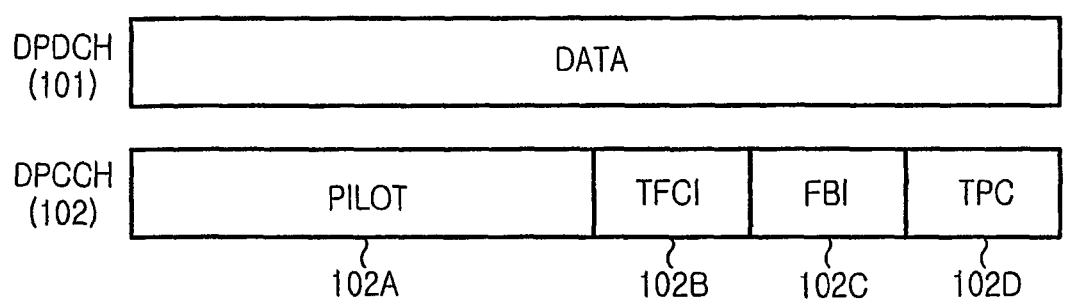
FIG. 1 shows the uplink physical channel structure of the FDD in R99/Rel-4.
Figure 2:
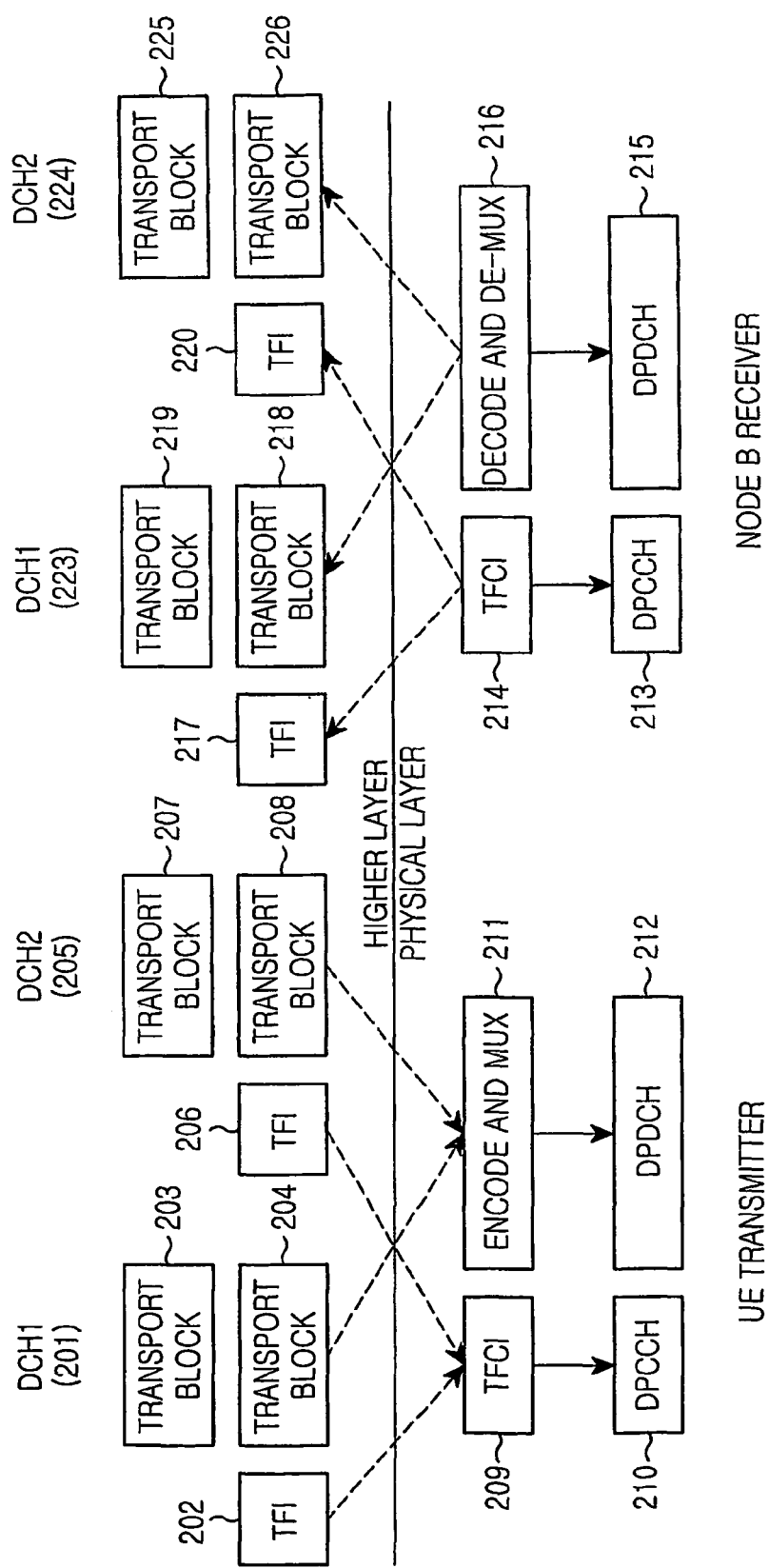
FIG. 2 illustrates the process of generation transmission and receiving of the TFCI in the WCDMA system.
Figure 3:
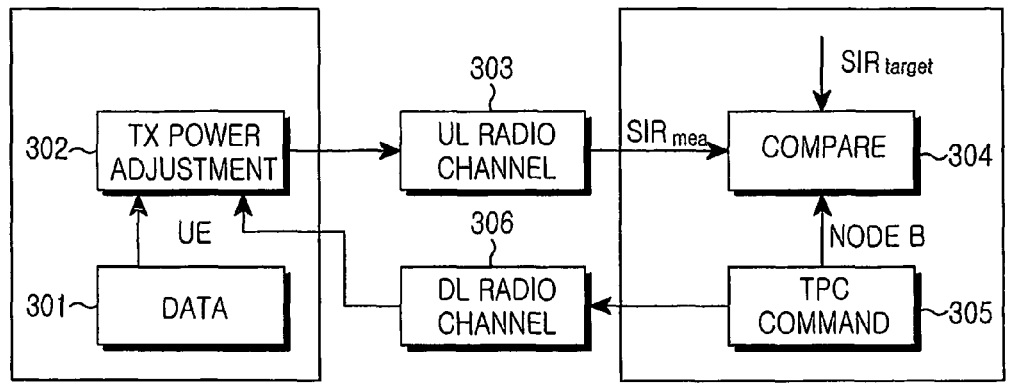
FIG. 3 illustrates the process of uplink power control in the WCDMA system.

In FIG. 6, the calculation in step 601 must be conducted earlier than the operations in step 602 and 603, because the adjustments to the power of the pilot and other physical channels conducted in step 602 and 603 must be based on that the power of other parts in the DPCCH have been adjusted well according to the downlink TPC commands. Since there is no interaction between the calculation of step 602 and 603, the operation timing relationship can be at will, i.e., it is OK that either step 602 is conducted earlier than step 603 (as shown in FIG. 6) or vice versa. It should be noted that the process shown in FIG. 6 is not the one that the Node B actually adjusts the power but determines the power of every uplink physical channel. Referring to FIG. 1, the DPDCH 101 and the DPCCH 102 are transmitted in parallel, so the adjustments to the power of DPDCH and the pilot are conducted at the same time. However, the adjustment to the power of the pilot is conducted earlier than that to the power of the other parts (e.g., TFCI, TPC, etc.) of the DPCCH.

Figure 11:
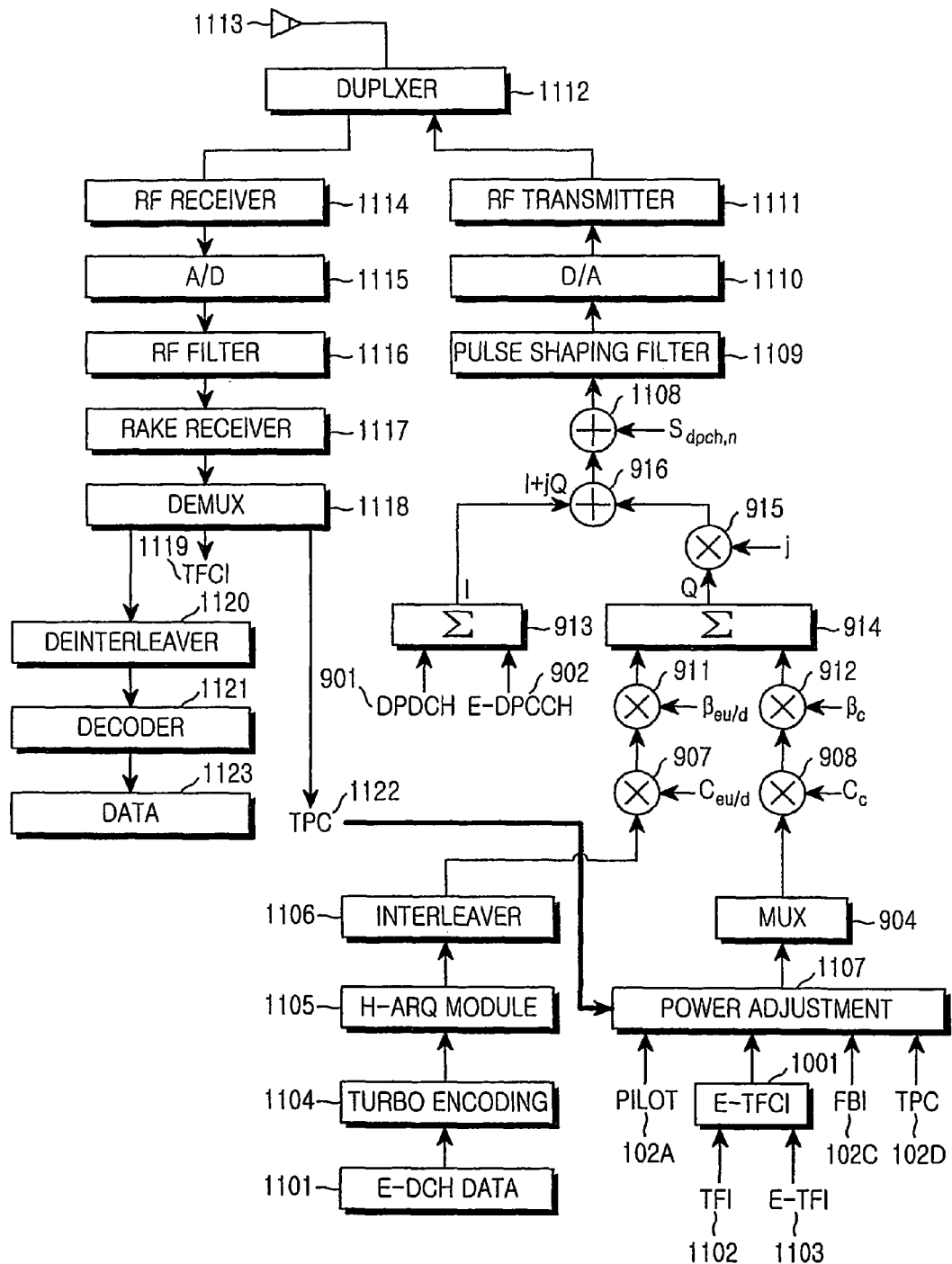
FIG. 11 shows an example of hardware block diagram of the UE.

FIG. 11 shows an example of the hardware block diagram of the UE implemented the present invention.

Firstly, the hardware structure of UE transmitter will be explained. Data 1101 of the E-DCH passes through the module 1104 for Turbo encoding. Then the encoded data is input into the H-ARQ module 1105. The H-ARQ module 1105 is mainly used for utilizing the link efficiency improvement introduced by the re-transmission of the physical layer. Data output from the H-ARQ module 1105 is input into the interleaver 1106 for interleaving to reduce the performance loss resulted from the fading channel. Then it passes through the spreading module 907 and multiplies by the gain factor in module 911. And in the physical layer of the UE, the D-TFCI 1102 which indicates the DCH and the E-TFCI 1103 which indicates the E-DCH are combined into the TFCI 102B. In the power adjustment module 1107, the E-TFCI 102B, the FBI 102C and the TPC 102D begin to set the transmitting power according to the received downlink TPC 1122 and the directions in process 601. And in the power adjustment module, the transmitting power of pilot 102A is set according to the directions in process 602. In module 904, the pilot 102A, E-TFCI 1001, FBI 102C and TPC 102 are multiplexed to the DPCCH. Then the DPCCH is processed by the spreading module 908 and multiplies by the gain factor in module 912. According to process 603, the UE sets the transmitting power for the DPDCH 901, the E-DPCCH 902 and the E-DPDCH. The base band signal is scrambled in module 1108. It is for the object of distinguishing the signal of the UE from the other UEs. The scrambled signal passes through the pulse shaping filter 1109, which is adopted to confine the signal of the UE within a specific bandwidth. Then the signal passes through the DAC 1110 and is converted from digital to analog signal. Next, the signal is input into the RF (Radio Frequency) transmitter 1111 to execute the RF related operations. The output from the RF transmitter is input into the duplexer 1112 and finally transmitted to the wireless channel through antenna 1113.

Secondly, the hardware structure of the UE receiver will be explained. Signal transmitted from the Node B is received by antenna 1113 of the UE and passes through the duplexer 1112 to enter RF receiver 1114 of the UE. Here, the oscillator is adjusted and operation of AGC (Automatic Gain Control) is performed on the signal. Then the received signal is converted from analog to digital in the ADC (Analog-to-Digital Converter) 1115. The digital signal is subject to de-scramble, de-spreading, and multi-path signal combining process and demodulation process sequentially in the RAKE receiver 1117. And the demodulated data is demultiplexed into the DCH data, TFCI 1119 and TPC 1122, etc. through the de-multiplexer 1118. The DCH data is recovered to data 1123 after passing through the de-interleaver 1120 and the decoder 1121. The UE transmits the TPC 1122 received via the downlink to the power adjustment module 1107 to complete the function of inner loop power control.

Figure 12:
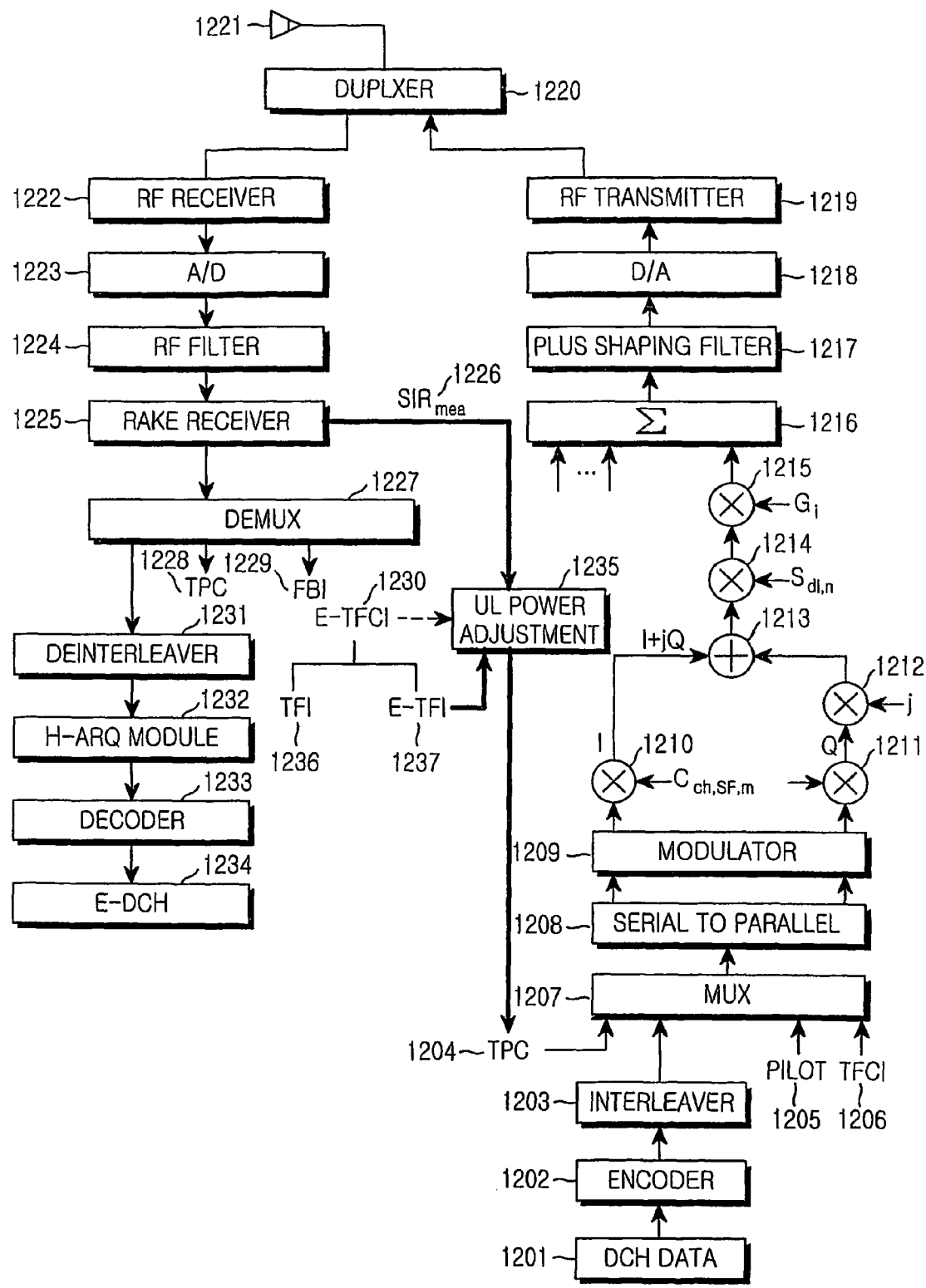
FIG. 12 shows an example of hardware block diagram of the Node B.

FIG. 12 shows an example of the hardware block diagram of the Node in the present invention.

Firstly, the hardware structure of the Node B transmitter will be explained. DCH data 1201 passes through the encoder 1202 for channel encoding. Then the encoded data is input into the interleaver 1203 for interleaving. Now, the data is multiplexed (this process is conducted in the multiplexer 1207) with the Pilot 1205, TFCI 1206 and the downlink TPC 1204 transmitted from the uplink power control module 1235. The multiplexed data is modulated by the modulator 1209 after it experiences serial-parallel conversion in module 1208. And the modulated data is subject to spreading by module 1210 in branch I and module 1211 in branch Q respectively. Data of branch Q multiplies j in the module 1212. Data of branch I and Q compose the base band signal in module 1213 and the base band signal is scrambled in module 1214. Then the scrambled signal is multiplexed (this process is conducted in the adder 1216) with other downlink physical channels in the mode of CDM after it is multiplied by the gain factor in module 1215. The downlink signal is converted from digital to analog after it passes through the pulse shaping filter 1217 and the DAC 1218. Next, the signal is input into the RF (Radio Frequency) transmitter 1219 to experience RF related operations. The output from the RF transmitter is input into the duplexer 1220 and finally transmitted to the wireless channel through antenna 1221.

Secondly, the hardware structure of the Node B receiver will be explained. Signal transmitted from the UE is received by antenna 1221 of the Node B and passes through the duplexer 1220 to enter RF receiver 1222 of the Node B. Then the received signal is converted from analog to digital in the Analog-to-Digital Converter 1223. The digital signal is subject to the de-scramble, de-spreading, multi-path signal combining process and demodulation process sequentially in the RAKE receiver 1225. And the demodulated data is demultiplexed into the E-DCH data, the TFCI 1230, the FBI 1229 and the TPC 1228, etc. through the de-multiplexer 1227. The E-DCH data is recovered to data 1234 after passing through the de-interleaver 1231, the H-ARQ module 1232 and the decoder 1233. The TFCI 1230 can be split into the D-TFCI 1236 and the E-TFCI 1237. The Node B obtains the corresponding pilot power boosting amplitude according to the TFCI 1230 or the E-TFCI 1237. And the $SIR_{est}$ (Signal-to-Interference Ratio) of the signal is estimated in the RAKE receiver 1225 of the Node B. The uplink power control module 1235 of the Node B generates the TPC commands 1204 according to $SIR_{est}$, the pilot power boosting amplitude, the current $SIR_{target}$ and the directions in process 503.

What is claimed is:

1. A method for supporting pilot boost to the uplink dedicated channels in the Wideband Code Division Multiple Access system comprising steps of:

transmitting a first E-TFCI in a first transmission time interval (TTI) to a Node B by a UE before transmitting a first E-DCH in a second TTI corresponding to the first E-TFCI, wherein the second TTI includes a second E-TFCI that corresponds to a second E-DCH in a third TTI;

adjusting an uplink pilot power boosting amplitude by the UE according to the first E-TFCI; and performing an uplink inner loop power control by the Node B according to a measured SIR, a target preset by the inner loop power control and the uplink pilot power boosting amplitude resulted from the first E-TFCI.

2. The method according to claim 1, wherein the UE transmits a D-TFCI and a DCH corresponding to the D-TFCI synchronously.

3. The method according to claim 1, wherein the timing relationship on transmitting the E-TFCI in advance must satisfy that the ending time of E-TFCI's TTI must be earlier than the starting time of TTI of the E-DCH corresponding to the E-TFCI.

4. The method according to claim 1, wherein when the uplink inner loop power control is performed by the Node B, if $SIR_{est} < SIR_{TARGET} + \Delta P_{pilot}$, the Node B sends a TPC UP command to demand the UE to increase the transmitting power; otherwise, it sends a TPC DOWN command to demand the UE to decrease the transmitting power.

5. The method according to claim 1, wherein the UE calculates a transmitting power of the pilot according to the E-TFCI and the equation below $$P_{pilot} = P_c + \Delta P_{pilot.}$$

6. The method according to claim 1, wherein a RNC notifies the Node B through an Iub signaling of the pilot power boosting amplitude corresponding to a reference E-TFCI, and notifies the UE through a RRC signaling of the pilot power boosting amplitude corresponding to the reference E-TFCI.

7. The method according to claim 1, wherein the Node B and the UE calculate the pilot power boosting amplitudes corresponding to other E-TFCIs according to that corresponding to the reference E-TFCI.

8. The method according to claim 1, wherein the UE transmits the D-TFCI to the Node B before the transmission of the DCH corresponding to the D-TFCI.

9. The method according to claim 1, wherein the UE transmits the TFCI which is generated by encoding the D-TFCI and the E-TFCI before the transmission of the E-DCH corresponding to the E-TFCI.

* * * * *